US008635249B2

(12) United States Patent
Anand et al.

(10) Patent No.: US 8,635,249 B2
(45) Date of Patent: Jan. 21, 2014

(54) FEDERATION OF MULTI-LEVEL MASTER DATA MANAGEMENT SYSTEMS (75) Inventors: Rangachari Anand, Teaneck, NJ (US); Stacy F. Hobson, Poughkeepsie, NY (US); Juhnyoung Lee, Yorktown Heights, NY (US); Xuan Liu, Yorktown Heights, NY (US); Yuan Wang, Beijing (CN); Jeaha Yang, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 13/117,370

(22) Filed: May 27, 2011

(65) Prior Publication Data

US 2012/0303672 A1 Nov. 29, 2012

(51) Int. Cl.
*G06F 17/30* (2006.01)

(52) U.S. Cl.
USPC .......................................... 707/790; 707/802

(58) Field of Classification Search
USPC ................................................ 707/220, 224
See application file for complete search history.

(56) References Cited

U.S. PATENT DOCUMENTS

| | | | |
|---|---|---|---|
| 5,550,971 A | 8/1996 | Brunner et al. | |
| 5,590,326 A | 12/1996 | Manabe | |
| 5,649,102 A | 7/1997 | Yamauchi et al. | |
| 5,872,850 A | 2/1999 | Klein et al. | |
| 6,064,968 A | 5/2000 | Schanz | |
| 6,256,676 B1 | 7/2001 | Taylor et al. | |
| 6,327,594 B1 | 12/2001 | Van Huben et al. | |
| 6,424,872 B1 * | 7/2002 | Glanzer et al. | 700/18 |
| 6,496,862 B1 * | 12/2002 | Akatsu et al. | 709/224 |
| 6,523,064 B1 * | 2/2003 | Akatsu et al. | 709/226 |
| 6,591,265 B1 | 7/2003 | Erickson et al. | |
| 6,594,530 B1 * | 7/2003 | Glanzer et al. | 700/18 |
| 6,615,166 B1 * | 9/2003 | Guheen et al. | 703/27 |
| 6,738,975 B1 | 5/2004 | Yee et al. | |
| 6,779,184 B1 | 8/2004 | Puri | |
| 6,999,824 B2 * | 2/2006 | Glanzer et al. | 700/18 |
| 7,114,146 B2 | 9/2006 | Zhang et al. | |
| 7,131,057 B1 | 10/2006 | Ferrucci et al. | |
| 7,167,762 B2 * | 1/2007 | Glanzer et al. | 700/79 |
| 7,213,037 B2 | 5/2007 | Rangadass | |
| 7,237,225 B2 | 6/2007 | Kompalli et al. | |
| 7,293,010 B2 | 11/2007 | Angele et al. | |

(Continued)

OTHER PUBLICATIONS

Loser, et al., Master Data Management for Collaborative Service Processes, International Conference on Service Systems and Service Management, Beijing, China, 2004.

(Continued)

*Primary Examiner* — Kim Nguyen
(74) *Attorney, Agent, or Firm* — Scully, Scott, Murphy & Presser, P.C.; William Stock, Esq.

(57) ABSTRACT

Federating multiple-level master data management systems may include a first set of master data management nodes having one or more common characteristics. A first group master data management node may be assigned to centrally manage the first set of master data management nodes, the first group master data management node maintaining master data management functionalities at a group level and providing a single logical view of master data to the first set of master data management nodes. Each master data management node in the first set has data access link with the first group master data management node based on implementation style of said each master data management node.

21 Claims, 8 Drawing Sheets

(56) References Cited

U.S. PATENT DOCUMENTS

| | | | |
|---|---|---|---|
| 7,305,392 B1 | 12/2007 | Abrams | |
| 7,370,092 B2* | 5/2008 | Aderton et al. | 709/220 |
| 7,509,326 B2 | 3/2009 | Krabel et al. | |
| 7,571,447 B2 | 8/2009 | Ally et al. | |
| 7,603,300 B2 | 10/2009 | Haffner et al. | |
| 7,617,174 B2 | 11/2009 | Chen et al. | |
| 7,620,647 B2 | 11/2009 | Stephens et al. | |
| 7,620,980 B1 | 11/2009 | Wood et al. | |
| 7,631,089 B2 | 12/2009 | Knauerhase et al. | |
| 7,707,281 B2* | 4/2010 | Baretzki | 709/224 |
| 7,725,429 B2 | 5/2010 | Rangadass et al. | |
| 7,895,445 B1 | 2/2011 | Albanese | |
| 8,285,838 B2* | 10/2012 | Rehman et al. | 709/224 |
| 8,332,923 B2* | 12/2012 | Oba et al. | 726/10 |
| 8,392,541 B2* | 3/2013 | Agarwal et al. | 709/220 |
| 2003/0137539 A1 | 7/2003 | Dees | |
| 2004/0103103 A1 | 5/2004 | Kalthoff et al. | |
| 2005/0055556 A1 | 3/2005 | Shiu et al. | |
| 2006/0101096 A1 | 5/2006 | Fuerst | |
| 2006/0259923 A1 | 11/2006 | Chiu | |
| 2006/0287890 A1 | 12/2006 | Stead | |
| 2007/0220035 A1 | 9/2007 | Misovski | |
| 2007/0220588 A1 | 9/2007 | Panda et al. | |
| 2007/0239858 A1 | 10/2007 | Banerji et al. | |
| 2007/0282748 A1 | 12/2007 | Saint Clair | |
| 2008/0052310 A1 | 2/2008 | Rangadass | |
| 2008/0059543 A1 | 3/2008 | Engel | |
| 2008/0256467 A1 | 10/2008 | Chu | |
| 2009/0099852 A1 | 4/2009 | Ouimet | |
| 2009/0177863 A1* | 7/2009 | Rehman et al. | 712/30 |
| 2010/0030623 A1 | 2/2010 | Guglani | |
| 2010/0042641 A1 | 2/2010 | Kamalakantha et al. | |
| 2010/0122155 A1 | 5/2010 | Monsarrat | |
| 2010/0218167 A1 | 8/2010 | Turner et al. | |
| 2011/0010759 A1 | 1/2011 | Adler | |
| 2011/0025707 A1 | 2/2011 | Fujioka | |
| 2011/0047597 A1 | 2/2011 | Mahaffey | |
| 2011/0078243 A1 | 3/2011 | Carpenter | |

OTHER PUBLICATIONS

Ullman, Information integration using logical views, Theoretical Computer Science—Special issue on the 6th International Conf. on DB Theory—ICDT, vol. 239 Is. 2, May 2000.

Genesereth, et al., Infomaster: an information integration system, SIGMOD '97 Proceedings of the 1997 ACM SIGMOD international conference on Management of data, 1997.

Arens, et al., Query reformulation for dynamic information integration, Journal of Intelligent Information Systems, vol. 6 Issue 2-3, Jun. 1996.

Themistocleous, et al., ERP and application integration: Exploratory survey, AMCIS 2001 proceedings.

Lee, et al., Enterprise integration with ERP and EAI, Communications of the ACM, vol. 46 Issue 2, Feb. 2003.

Zeng, et al., QoS-aware middleware for Web services composition, IEEE Transactions on Software Engineering, vol. 30 Issue 5, May 2004.

Zeng, Quality driven web services composition, WWW '03 Proceedings of the 12th international conference on World Wide Web, 2003.

Milanovic, Current Solutions for Web Service Composition, IEEE Internet Computing, vol. 8, Issue 6, Nov. 2004.

Benatallah, et al., The Self-Serv environment for Web services composition, IEEE Internet Computing, vol. 7, Issue 1, Jan./Feb. 2003.

Casati, et al., Adaptive and Dynamic Service Composition in eFlow, CAiSE '00 Proceedings of the 12th International Conf. on Advanced Information Systems Engineering, 2000.

Gold, et al., Understanding Service-Oriented Software, IEEE Software, vol. 21 Issue 2, Mar. 2004.

Drummond, et al., A Data Broker for Distributed Computing Environments, ICCS '01 Proceedings of the International Conference on Computational Sciences-Part I, 2001.

Modahl, et al., MediaBroker: An Architecture for Pervasive Computing, PERCOM '04 Proceedings of the 2nd IEEE Intntnl Conf. on Pervasive Computing and Communications, 2004.

Mouhib Alnoukari, Applying Adaptive Software Development (ASD) Agile Modeling on Predictive Data Mining Applications: ASD-DM Methodology, Int. Symposium on Info. Tech., 2008.

Cervantes, et al, A Framework for Constructing Adaptive Component-Based Applications: Concepts and Experiences. 7th Symposium on Computer-Based Software Engineering, 2004.

Gui, et al, An Architectural Based Framework for Managing Adaptive Real-time Applications, 35th Euromicro Conference on Software Engineering and Advanced Applications, 2009.

Mena, et al, A Software Retrieval Service Based on Adaptive Knowledge-Driven Agents for Wireless Environments, ACM Transactions on Autonomous & Adaptive Systems, V.1 I.1 2006.

Jeff Kelly, New Online Marketplace Could Boost Data Integration Applications, DataManagement.com, Feb. 18, 2010. http://searchdatamanagement.techtarget.com/news/1389686.

Turner, Turning Software into a Service, Computer, vol. 36 Issue 10, Oct. 2003.

Deep Secure, The Deep-Secure Mail Guard Applies Policy Enforcement and Content Checking to Email, Deep Secure Mail Guard Information and Fact Sheet, 2010.

Anca Andreescu et al., "Combining Actual Trends in Software Systems for Business Management," lnternation Conference on Computer Systems and Technologies, Jun. 12-13, 2008.

Allen Drelbelbis et al., "Enterprise Master Data Management, An SOA Approach to Managing Core Information," IBM Press, Pearson plc, Upper Saddle River, NJ.

Jean-Sebastier Brunner et al., Explorations in the Use of Semantic Web Technologies for Product Information Management, May 8-12, 2007, Banff, Alberta, Canada.

Michael Franklin et al., "From Databases to Dataspaces: A New Abstraction for Information Management," Sigmod Record, 34(4):27-33, 2005.

* cited by examiner

FEDERATION OF MULTI-LEVEL MASTER DATA MANAGEMENT SYSTEMS

FIELD

The present application relates generally to computers and applications, and more particularly to master data management systems and federating the master data management systems, for instance, in a multi-level fashion.

BACKGROUND

Master data refers to facts that describe the core of entities, for example, an organization's employees, customers, suppliers, partners, organizations, products, materials, accounts, medical records, locations, and others. Such master data are of high value information that an organization uses repeatedly across many business processes. *Enterprise Master Data Management* by Allen Dreibelbis, Eberhard Hechler, Ivan Milman, Martin Oberhofer, Paul van Run and Dan Wolfson, IBM Press, 2008 provide background on master data management.

Managing master data faces challenges in that the data is usually scattered throughout the enterprise without consistent view of the master data. Fragmentation occurs as a result of the data being trapped inside enterprise resource planning (ERP), customer relationship management (CRM) and other commercially available off-the-shelf (COTS) packages. Factors such as mergers and acquisitions, experiments in new markets, decentralized businesses, and legal requirements across geographical boundaries also may contribute to fragmentation and inconsistency in master data.

Master data may be managed as objects and attributes, and by defining transactions over and access control to the objects and attributes. Data governance procedures may be also defined for functionalities such as conflict resolution, data import and data integration.

An MDM system or server should ensure consistent master information across transactional and analytical systems, address key issues such as data quality and consistency proactively rather than "after the fact" in the data warehouse, decouple master information from individual applications, become a central, application independent resource, and simplify ongoing integration tasks and new app development. An MDM system can be implemented with different styles. For instance, in "consolidation" style implementation, data is periodically replicated to the MDM server. In "register" style implementation, an MDM server knows where to find the data. In "transactional hub" style implementation, an MDM server becomes the system of record for master data. Applications should be appropriately architected to use this style of MDM implementation.

InfoSphere™ MDM is an MDM product from International Business Corporation (IBM), Armonk, N.Y. InfoSphere™ MDM product family includes Master Data Management Server with data model that include three domains (party, product, account), Master Information Hub that allows a user to make user's own domain and data models, and Master Data Manager for Product Information Management, which is a web-based collaborative authoring environment for a product domain in a data model. The party domain of the MDM Server manages the entirety of data related to parties such as customers, vendors, and suppliers, people and organization. The product domain of the MDM Server manages the definitions of products, category hierarchies, bundles, and equivalences. Its collection of products makes up a product catalog that is accessible throughout the enterprise. The account domain of the MDM Server manages business relationships and agreements with other parties, such as billing, claims and contracts. MDM functionalities include suspecting duplicate processing (also referred to as "data stewardship") that prevents inadvertent creation of duplicate parties and products, for instance, using matching techniques; managing history of data modifications (also referred to as "point-in-time history"), which includes a full audit database that contains the full modification histories of all data objects and a set of query options for the audit database; keeping track of the source of all data and when it was added (also referred to as "source value"); maintain links to documents stored in a Content Management System (CMS) (also referred to as "document attachments"); and allowing administrators to define what elements and sub-elements users and user groups can see based on defined constraints (also referred to as "rules of visibility").

To date, conventional use of master data management includes managing a single physical and logical MDM system for an entire enterprise, in which the scope of the applications and organizations of MDM is determined in the design stage. However, in many organizations, there may be requirements for multiple and multiple-level (hierarchical) MDM systems.

BRIEF SUMMARY

Federating multiple-level master data management systems may be provided. A system for federating multiple-level master data management systems, in one aspect, may include a first set of master data management nodes having one or more common characteristics. A first group master data management node may be assigned to centrally manage the first set of master data management nodes, the first group master data management node maintaining master data management functionalities at a group level and providing a single logical view of master data to the first set of master data management nodes. Each master data management node in the first set has data access link with the first group master data management node based on implementation style of said each master data management node.

A method of federating multiple-level master data management systems, in one aspect, may include grouping a first set of master data management nodes according to one or more common characteristics and collecting information associated with the first set of master data management nodes. The method may also include creating a first group master data management node to centrally manage the first set of master data management nodes and master data shared among the first set of master data management nodes. The method may further include establishing rules of visibility for each master data management node in the first set based on the collected information. The method may yet further include establishing data access link type between the first group master data management node and said each master data management node in the first set based on implementation style of said each master data management node.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

The present disclosure in one aspect provides for federation of multi-level master data management (MDM) systems, for instance, in organizations where there may be requirements for multiple and multiple-level (hierarchical) physical MDM systems. In one aspect of the present disclosure, a single logical MDM view is provided for the multiple and multiple-level physical MDM systems. The MDM systems may be established in the bottom-up manner, and the MDM functionalities may be ensured in this federated MDM environment.

The systems and/or methodologies of the present disclosure allows for adding, modifying, and/or removing an MDM, as needed or desired, in a platform (or network) containing a plurality of MDM systems, and federate it with the existing MDM systems to maintain a single logical MDM view in the platform. An example platform is a government data platform, for instance, operating on a municipal service cloud. In one aspect, the systems and/or methodologies of the present disclosure allows for defining the scope of the applications and organizations represented by the new MDM in view of existing MDM systems in the platform; leveraging (using) the existing MDM systems, which may be implemented in a different architectural style, to design and implement the new MDM system more efficiently; federating different (e.g., existing and new) MDM systems to make them work together and consolidate and share master data among different level of organizations and applications; handling different types of MDM addition, e.g., MDM system and a group MDM systems. At the same time, the systems and/or methodologies of the present disclosure may ensure MDM functionality (e.g., data stewardship, point-in-time-history, source value, document attachments, rules of visibility) to be performed properly in the federated MDM environment.

In one aspect, a methodology of the present disclosure may establish one or more links between new coming MDM system with existing MDM systems to make them work together and leverage each other's data. The methodology of the present disclosure in another aspect may manage the topology of MDM network and coordinate the MDM systems (also referred to as nodes) and links between them. Yet in another aspect, the methodology of the present disclosure may control the data flow in MDM network, while keeping with the MDM functionality such as data stewardship (suspect duplicate processing), point-in-time history, source value tracking, document attachments, and rules of visibility.

MDM functionality at the group level may include one or more of the following: suspect duplicate processing ("data stewardship"), including managing "data stewardship" information repository in each MDM node, creating "data stewardship" repository for a group MDM node by leveraging "data stewardship" from the MDMs in the group, and performing "data stewardship" functionalities according to the data stewardship repository; point-in-time history functionality, for example, including a full audit database that contains the full modification histories of all data objects (e.g., from which MDM nodes); source value functionality, for example, including keeping track of the source of all data (e.g., specifying which MDM nodes have or own which data) and when the data was added; document attachments functionality, for example, including aliasing of MDM node links to documents stored in a content management system (CMS); rules of visibility functionality, for example, including creating "rules of visibility" based on "rules of visibility" from MDM nodes, setting up a group level rules by which other MDM nodes may see which parts of the master data, allowing to override "rules of visibility" from the MDM nodes; and defining "rules of visibility" for other groups.

Figure 1:
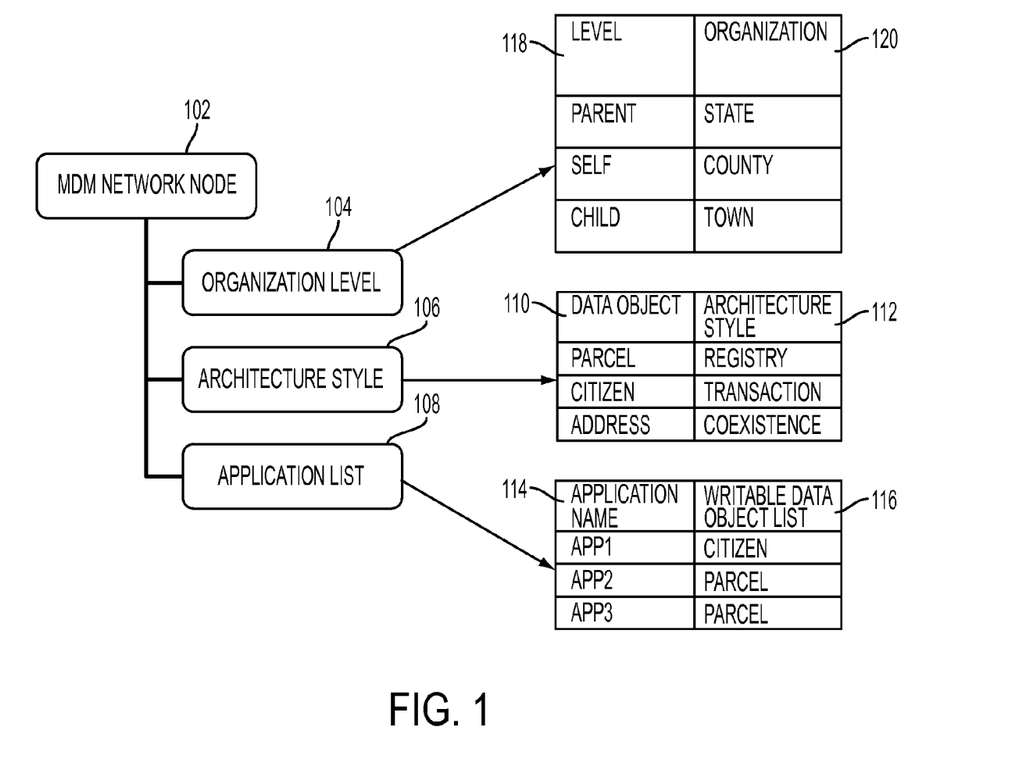
FIG. 1 illustrates an MDM network model in one embodiment of the present disclosure.

FIG. 1 illustrates an MDM network model in one embodiment of the present disclosure. The MDM network model represents an autonomous MDM system (also referred to as a node, or an MDM network node). An MDM network node 102 may be structured into different components: organization level 104, architecture style 106, and application list 108. Other structural definitions are possible. The organization level 104 may specify the levels 108 (e.g., parent, self, child) and names of the levels (e.g., state, county, town). The MDM network node 102 manages data objects 110, which may be implemented with three possible MDM "architecture styles" as shown at 112. The MDM network node 102 also manages applications that access the data objects 110, for instance, via an application list 108. The application list 108 may include the names of the applications 114 and one or more objects those applications write to as shown at 116.

A link may be established between two autonomous MDM systems, for instance, between a server or application of one MDM system to another MDM system's server or application. A link is established, for example, by allowing an MDM to access another MDM's data. The model shown in FIG. 1 may be used to identify the architecture of a new MDM node and links that should be established between the new node and one or more existing nodes in order to leverage them. The model may be also used to define the scope of the applications and organizations involved in the new MDM.

The present disclosure in one aspect provides for multi-level MDM system, for example, with established hierarchy with group MDM nodes and root MDM nodes to support multiple-level federated MDM systems. The methodology of the present disclosure may ensure MDM functionality in this federated multi-level MDM environment and provide a single logical MDM view in the system. In one embodiment of the present disclosure, a group MDM node ("Group MDM node") is provided as a central MDM node assigned to manage MDM nodes for a group and to ensure the MDM functionality at the group level and provide a single logical MDM view for the group. A group may comprise MDM nodes that have the same parent node. A root MDM node ("Root MDM node") may be provided as a central system assigned to manage all group MDMs for the entire system. All group MDM nodes directly link with the root MDM node, for instance, group MDM node server can communicate with the root MDM node server and have a means to access each other's data. The root MDM node may construct group MDM nodes to provide a single logical hierarchical view of all MDM nodes based on organization information. The root MDM node also may provide the MDM functionality in this federated MDM in the eco-system to provide a single logical MDM view in the eco-system.

MDM functionality at the root level may include one or more of the following: suspect duplicate processing ("data stewardship"), including creating "data stewardship" repository for a root MDM node based on "data stewardship" from the group MDM nodes, and performing "data stewardship" functionalities according to the data stewardship repository; point-in-time history functionality, for example, including a full audit database that contains the full modification histories of all data objects (e.g., from which group MDM nodes); source value functionality, for example, including keeping track of the source of all data (e.g., specifying which group MDM nodes have or own which data) and when the data was added; document attachments functionality, for example, including aliasing of group MDM node links to documents stored in a content management system (CMS); rules of visibility functionality, for example, including creating "rules of visibility" based on "rules of visibility" from group MDM nodes, setting up a root level rules by which other group MDM nodes may see which parts of the master data, allowing to override "rules of visibility" from the group MDM nodes.

Figure 2:
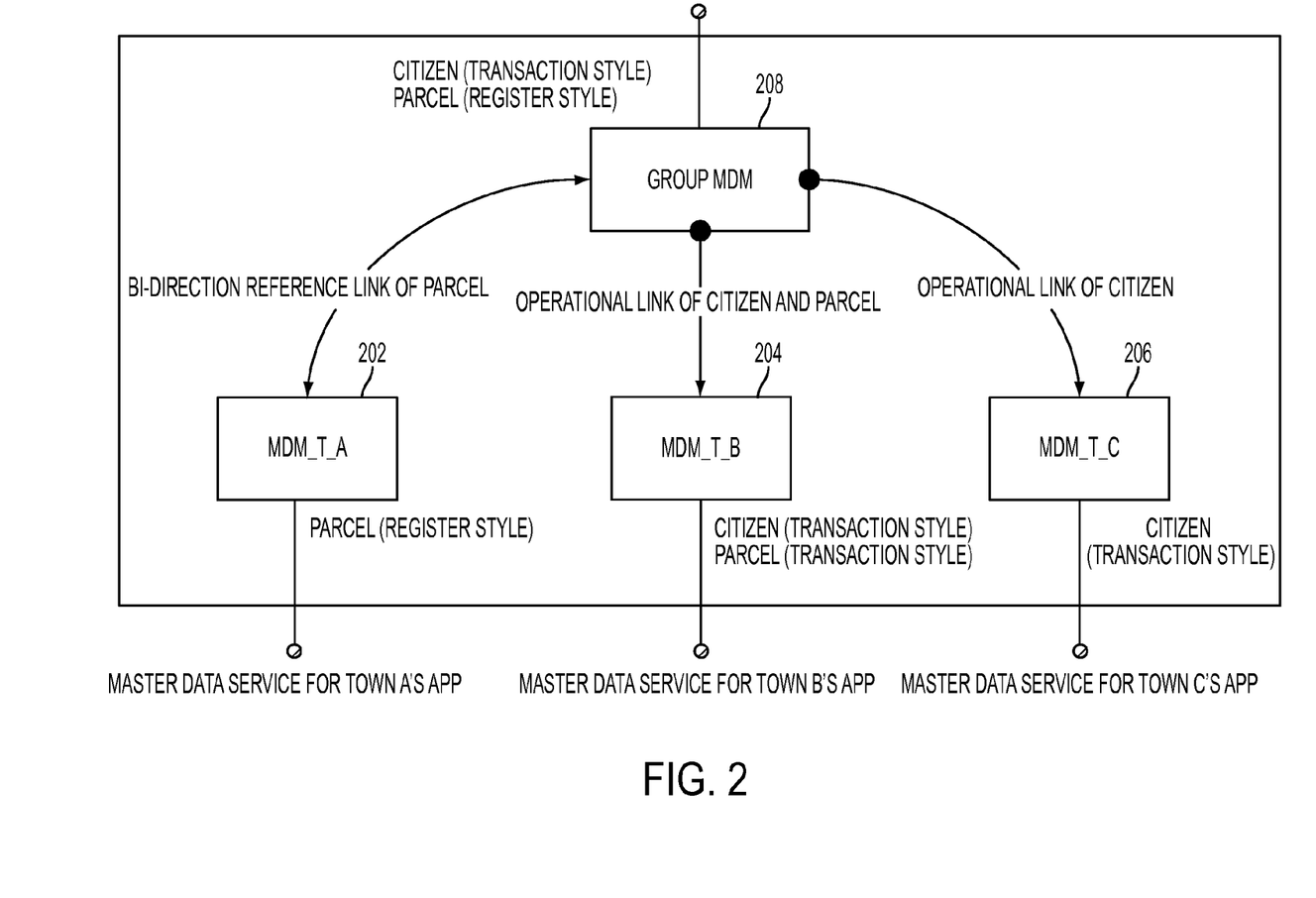
FIG. 2 illustrates an example of a MDM network model with a group represented by a single, logical central group MDM.

FIG. 2 illustrates an example of a MDM network model with a group represented by a single, logical central group MDM. A group MDM node may manage the federation of individual MDM nodes that are grouped based on their common characteristics and interest. For example, the local municipal governments in the town A, town B and town C may have common characteristics such as serving their citizen under the same county government policy and provide similar services to their citizens, These municipal governments also may like to share their ideas and data to maximize efficiencies and to provide better services to their citizens. The "Group MDM node" enables this group of local municipal governments to share master data among themselves and represents this group's master data in a higher level organization hierarchy.

FIG. 2 shows the MDM nodes organized in a hierarchical fashion with respect to their group node, For example, MDM nodes 202, 204, 206 represent entities in one hierarchical level in an organization; a group node 208 is assigned to manage the MDM nodes 202, 204 and 206 and act as a central manager to those nodes. For instance, in a government organization, the MDM nodes 202, 204 and 206 may represent MDM systems of three different towns in the same county. The MDM node 202 may provide the master data service for town A's applications; the MDM node 204 may provide the master data service for town B's applications; the MDM node 206 may provide the master data service for town C's applications. An operational link implies that the source node of the link is a transaction style MDM system and that it will manage the distributed transaction between the source node (the node that is supplying the data) and the target node (the node that is requesting the data) of the link. The arrow points to the target and the circle implies the source MDM system. A reference link is used when the source node has registry architecture style and the target node has read only access. A bi-directional reference link is used when the source node has registry architectural style and the target node may modify data. Different architectural styles can be used for different data objects within a node, and appropriate link is assigned for each data object. Details of the different link types and architecture style are also described in co-owned patent applications entitled "Federation of Master Data Management Systems" and "Data Stewardship in Federated Multi-level Master Data Management Systems", which applications are incorporated herein by reference in their entirety.

As described above, data objects may be architected or implemented in different architectural style. Depending on the architectural style, different links may be established. For instance, if a data object of a node is implemented as "registry" style, that node accesses data by a reference link from another node. As another example, if a data object of a node is implemented as "transaction" style, another node may access data from that node by operation link.

Briefly, in "consolidation" style implementation of an MDM system, individual application linked to the MDM system stores its own data, for instance, in its own database. The data is periodically replicated to the MDM server from each application's data. Thus, in this style, MDM server uses its own local copy of the data for operations.

Registry style implementation provides for real-time central reference. In registry style implementation, an individual MDM node connected to the source MDM (Group MDM) maintains its own data within its own MDM system. The source MDM maintains the references to these data by using unique global identifiers to the matched records, but does not update the data in the connected nodes. The Registry Style MDM node uses data federation capabilities to build the "virtual" consolidated view of the master data from the connected nodes.

Consolidation style implementation may be used for reporting, analysis and central reference. An individual MDM node connected to the source MDM (Group MDM) maintains its own data within its own MDM system, but nodes will periodically replicated their own data to the source MDM so the consolidated view of the master data is physically stored in the source MDM. This replicated and centrally located data gets updated after the event and not guaranteed to be up to date. The master data in this case is usually not used for transactions, but rather supports reporting. It can also be used for reference operationally but the master data stored in the MDM is not published to the connected applications.

Coexistence style may be used for harmonization across databases and for central references. An individual MDM node connected to the source MDM (Group MDM) maintains its own data within its own MDM system. The consolidated master data view is constructed in the same manner as in the consolidation style, and, in the operational world, consolidation style may evolve into the coexistence Style. The difference is that in this architectural style the master data stored in the source MDM is selectively published out to the connected systems. This consolidated master data view is used to harmonize master data across the connected nodes.

Transaction style implemented nodes may act as "System of Record" to support transactional activity. In this architecture, the source MDM stores, enhances and maintains all the master data attributes. It becomes the authoritative source and publishes this consolidated view back to the respective connected nodes. Connected transactional nodes can read master data from the source MDM, and, potentially, all connected nodes subscribe to updates published from the source MDM in a form of harmonization.

Table 1 explains what links should be established when a new node implemented in registry style is added to a network of MDMs. For example, if the architecture style of an existing node with which the new node should link is Registry, and if the user or application who will use the new node may modify the data (not read only), then the link between the new node and the existing node should be Bi-direction Reference link (one reference link from the new node to the existing node, and another reference link from the existing node to the new node). If the architecture style of the existing node with which the new node should link is Registry, and if the user or application that will use the new node can access the data as read only, then the link should be one reference link from the new node to the existing node. Other cells in this table provide similar explanation. The "Coexistence" and "Transaction" column in Table 1 may be interpreted similarly.

TABLE 1

| Architecture style of an existing node | Registry | Coexistence | Transaction |
|---|---|---|---|
| The application linked directly to the new node will modify the master data | Bi-direction Reference link between the new node and an existing node | Bi-direction Reference link between the new node and an existing node | Bi-direction Reference link between the new node and an existing node |
| The application linked directly to the new node will not modify the master data | Reference link from the new node to an existing node | Reference link from the new node to an existing node | Reference link from the new node to an existing node |

Figure 3:
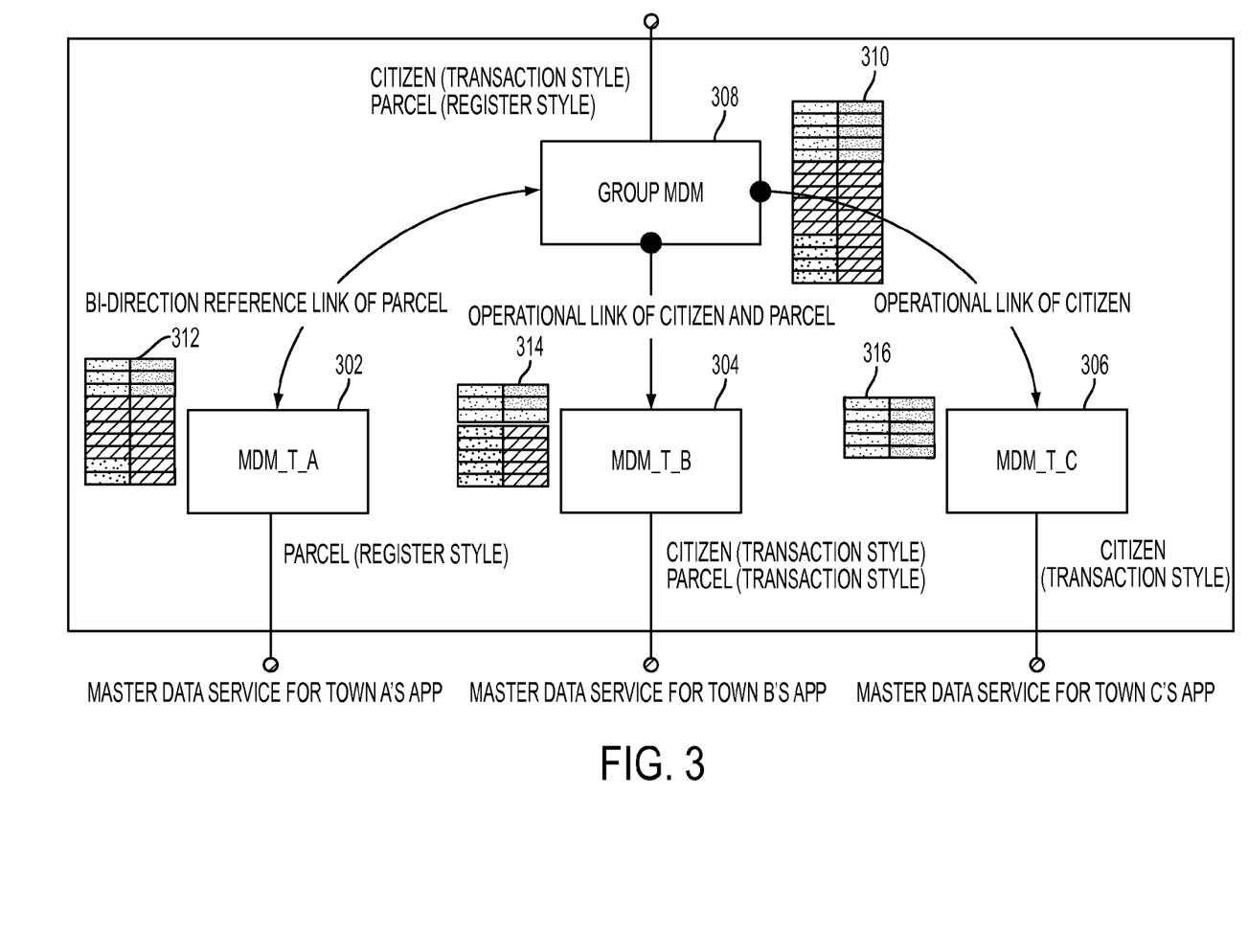
FIG. 3 illustrates an MDM network group level view in which each MDM node in the group may see some or all of aggregated logical view based on rule of visibility.

FIG. 3 illustrates an MDM network group level view in which each MDM node in the group may see some or all of aggregated logical view based on one or more rules of visibility. The group MDM node 308 in one embodiment of the present disclosure provides a single logical MDM view of these federated MDMs 302, 304, 306 in a group by maintaining all MDM functionality for this group. For example, the master data 310 which local municipal governments in the town A, town B and town C like to share can be registered and aggregated in the group MDM node 302 but each local municipal governments can only view the master data 312, 314, 316 that are allowed for them to view according to "rule of visibility" set by each local municipal governments. In one embodiment or the present disclosure, the same architecture style of each master data provided by the local municipal governments is propagated to the group MDM node 308 and data maintains the same architecture style.

Figure 4:
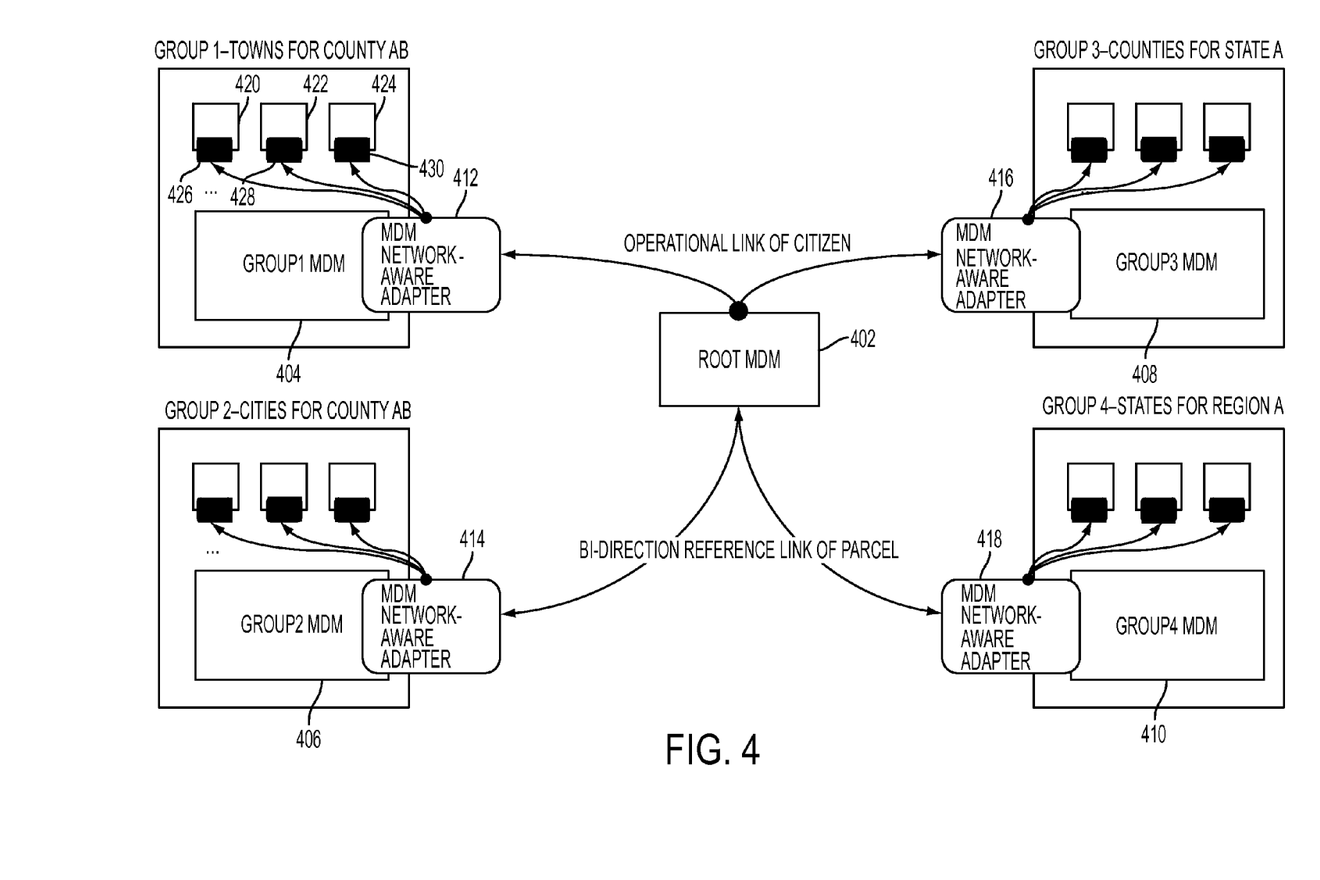
FIG. 4 illustrates an MDM network model example with multiple MDM groups represented by a single, logical, central root MDM.

FIG. 4 illustrates an MDM network model example with multiple MDM groups represented by a single, logical, central root MDM. A root MDM node 402 in one embodiment of the present disclosure manages the federation of group MDM nodes 404, 406, 408, 410 in the hierarchical manner based on their pre-defined organization rank or level in the eco-system. For example, a local municipal government group (Group 1) 404 may belong to a county government in a county government group (group 3) 408 and this group may belong to the state government which belongs to state government group (Group 4) 410 and so on. A group MDMs representing a group of cities (representing another level of MDM group) in the state, may be also managed by the root MDM node 402. All group MDM nodes 404, 406, 408, 410 directly link with the root MDM node 402 physically. The root MDM node 402 can provide a single logical hierarchy view of all MDM nodes 404, 406, 408, 410 managed by that root MDM node 402. The group MDM nodes 404, 406, 408, 410 can share their ideas and data to maximize efficiencies and to provide better services to their citizen through the root MDM node.

In one embodiment of the present disclosure, each group MDM 404, 406, 408, 410 has a network-aware adapter 412, 414, 416, 418, respectively, that enables the MDM to talk to another group MDM to establish one or more links between them and to synchronize the MDMs. Within a group MDM node, the adapter acts as an application, for example, for data objects implemented in register style. In the co-existence or transaction style MDM nodes, which maintains its own central data, MDM adapter can act as the central master database. In a hierarchical MDM, "Root MDM node" adapter can act as an MDM server, and the various "Group MDM node" adapters can act as applications connected to the MDM.

Each MDM node within each group MDM also has its own network-aware adapter in one embodiment of the present disclosure. For example, Group 1 MDM at 404 may include MDM nodes 420, 422, 424, each of which nodes includes a network-aware adapter 426, 428, 430. Network-aware adapters are described in more detail in the co-owned patent application entitled, "Federation of Master Data Management Systems", which is incorporated herein by reference in its entirety.

Figure 5:
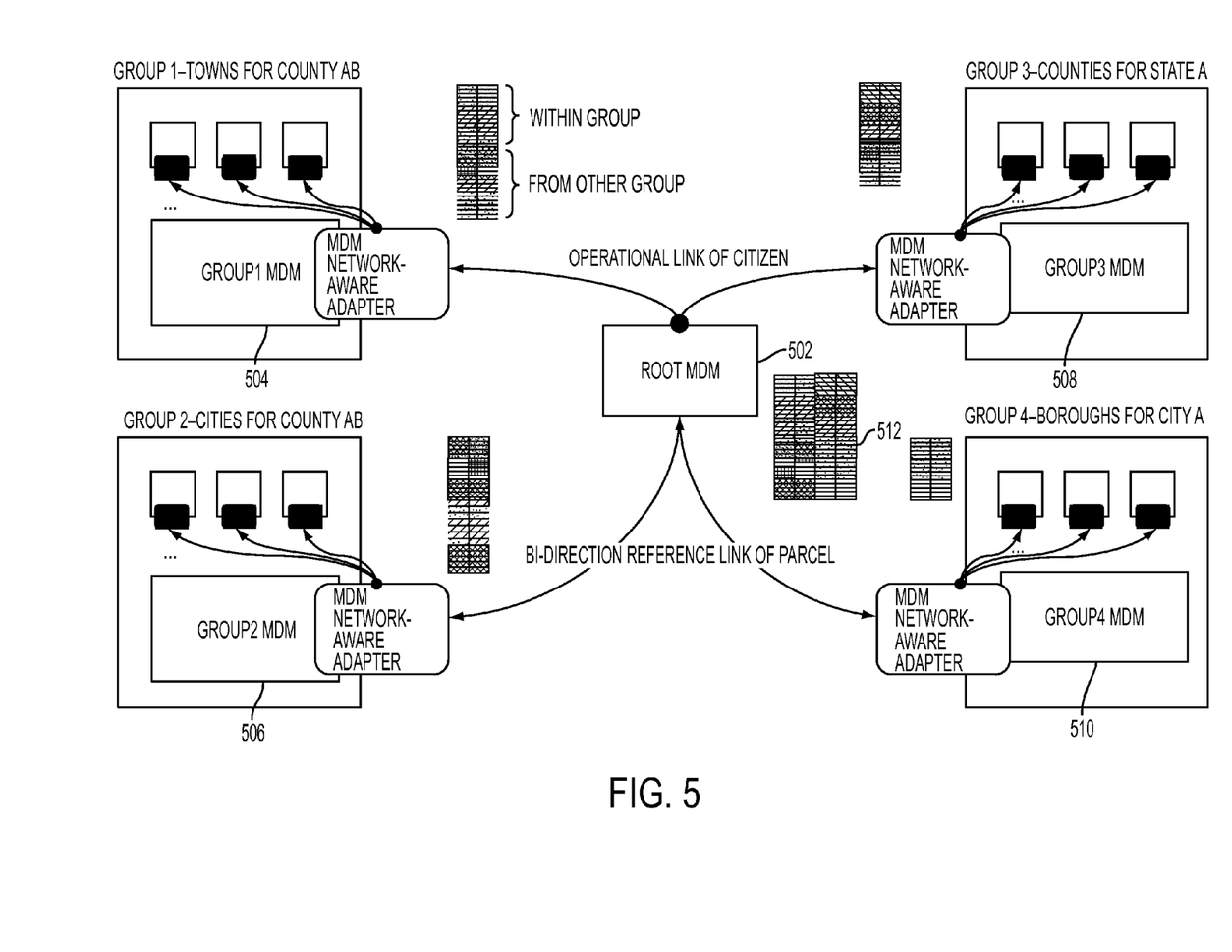
FIG. 5 illustrate an MDM network hierarchical view in one embodiment of the present disclosure in which each group may see some or all of aggregated logical view based on one or more rules of visibility.

FIG. 5 illustrate an MDM network hierarchical view in one embodiment of the present disclosure in which each group may see some or all of aggregated logical view based on one or more rules of visibility. In one embodiment of the present disclosure, a root MDM node 502 provides a single logical MDM view 512 of these group level MDMs 504, 506, 508, 510 in an eco-system by maintaining all MDM functionality for the eco-system. For example, the master data 512 which these group level MDMs like to share can be registered and aggregated in the root MDM node, but each group level MDMs 504, 506, 508, 510 can only view the master data 512 that are allowed for them to view according to "rule of visibility" set by each group level MDMs 504, 506, 508, 510. In one embodiment of the present disclosure, the same architecture style of each master data provided by the group level MDMs 504, 506, 508, 510 is propagated to the root MDM node 502 and the data maintains the same architecture style.

Figure 6:
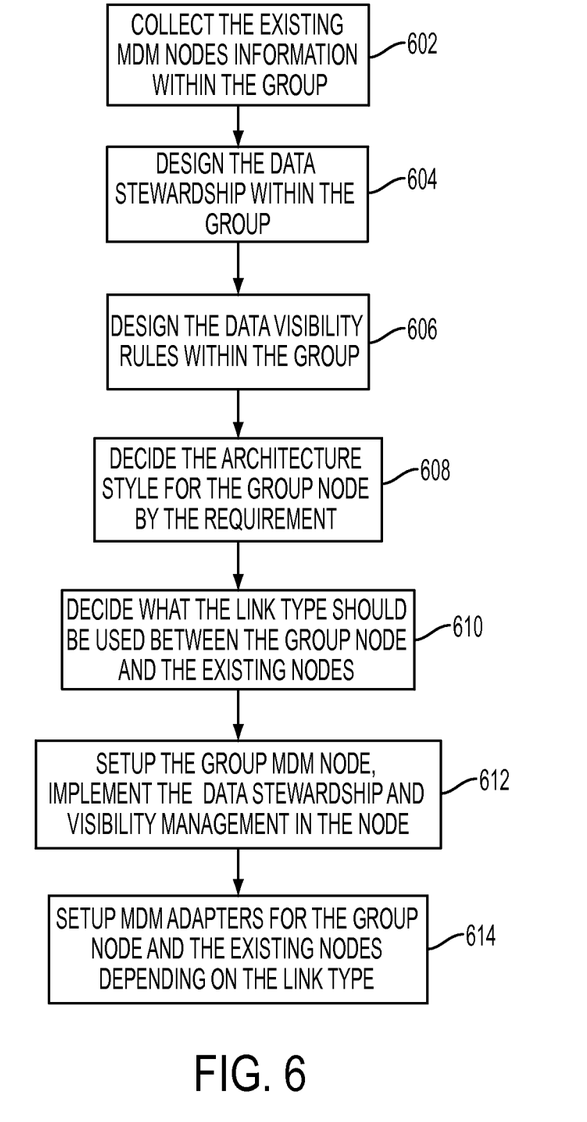
FIG. 6 is a flow diagram that illustrates method of grouping the existing MDM nodes in an organization in one embodiment of the present disclosure.

FIG. 6 is a flow diagram that illustrates a method of grouping the existing MDM nodes in an organization. Grouping allows a set of MDMs to act as a single MDM. For example, town municipal governments within a county can be grouped together to represent the county using the federated MDM methodology. These municipal governments can share data if needed among them while presenting their data together as county data to the state government. The method may be implemented as a computer executable module running on a processor. At 602, information is collected about the target MDM nodes (candidates) for this group. The collected information may include the architectural styles of the target nodes and their consolidated data information (data types, identifiers (IDs) to map actual data, link type to data).

At 604, data stewardship may be designed with the group. Target nodes' "data stewardship" repositories may be consolidated and at a group level, a group MDM node may manage and maintain "data stewardship". Group MDM may then perform "data stewardship" functionalities according to one or more rules or policies to resolve the data conflict.

At 606, data visibility rules within the group may be designed. Each participating member nodes can determine what data and attributes to publish and which nodes can subscribe to the data. Group MDM can collect all publish and subscribe pairs to determine "visibility rules" at a group level.

At 608, an architecture style for the group node may be decided based on one or more requirements. Architecture style can be determined based on the organization requirements and may depend on the architecture style of participating members of the group. For example, if all members use registry style then the group node is implemented in registry style.

At 610, link types to be used between the group node and the existing nodes are determined. Appropriate link type can be assigned once the architecture styles of the nodes in the group are determined.

At 612, the group MDM node is set up and the data stewardship and visibility management in the node are implemented. Once above steps are completed, the group MDM node may be configured to use the new "data stewardship" repository and "visibility rules".

At 614, MDM adapters are set up for the group node and the existing nodes, for instance, based on the link type. A group of MDM nodes can work together as a single MDM system.

Figure 7:
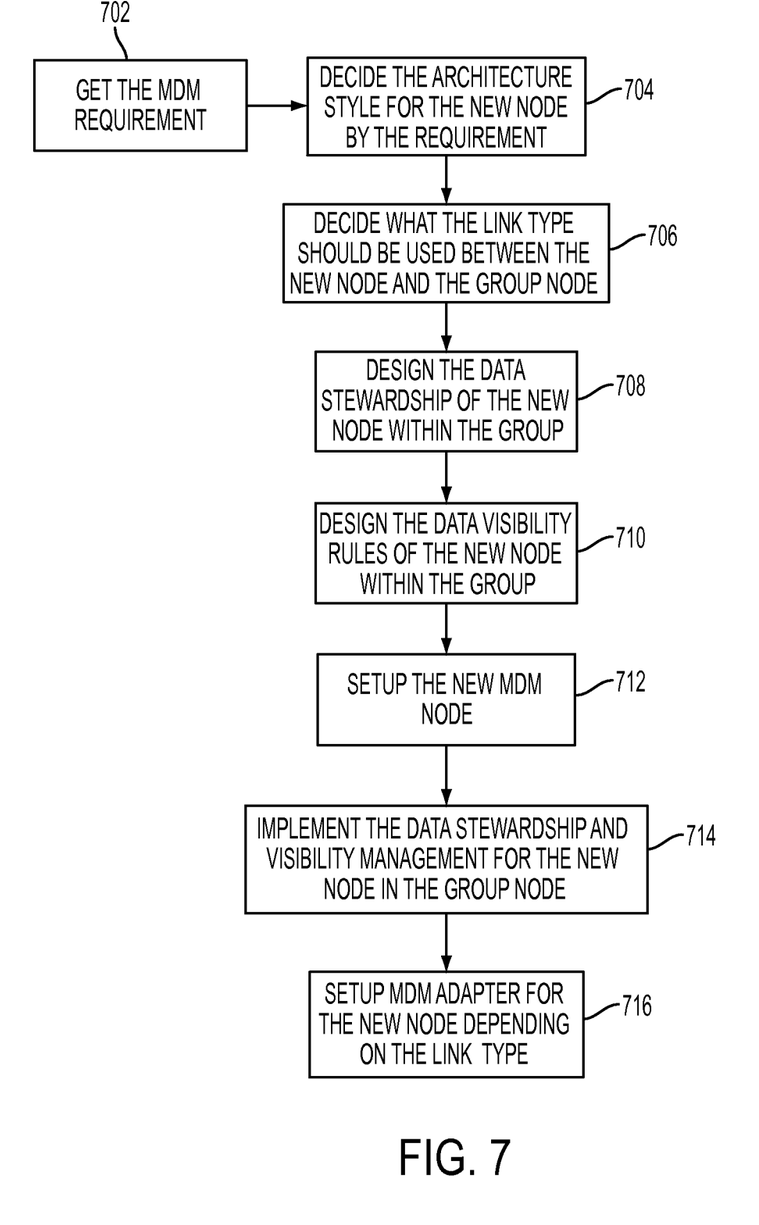
FIG. 7 is a flow diagram illustrating a method of adding an MDM node to a group in one embodiment of the present disclosure.

FIG. 7 is a flow diagram illustrating a method of adding an MDM node to a group in one embodiment of the present disclosure. At 702, MDM requirements of a new node to be added are obtained. Requirements may be imposed by an existing MDM system and the new MDM node may need to meet the requirements to be a member of the group. For example, if the group MDM node has registry style then the member should be able to work as a member in the MDM system that can work with the registry style MDM. At 704, the link type to be used between the new node and the group node. At 706, the data stewardship of the new node within the group is designed. The "data stewardship" repository for the newly adding node may be uploaded to the group MDM to extend existing group level "data stewardship" to include the new node. At 710, the data visibility rules of the new node within the group are designed. Administrator or users may determine what data objects and attributes of the new node should be published and which nodes can subscribe to them. At 712, the new MDM node is set up. Newly added node may be configured with the newly assigned links. At 714, the data stewardship and visibility management for the new node in the group node are implemented. In order to impose existing rules and policy to newly added node, the MDM system may be re-configured. At 716, an MDM adapter for the new node is setup based on the link type. The adapter for the newly added node may be re-configured to work with the group MDM node.

Figure 8:
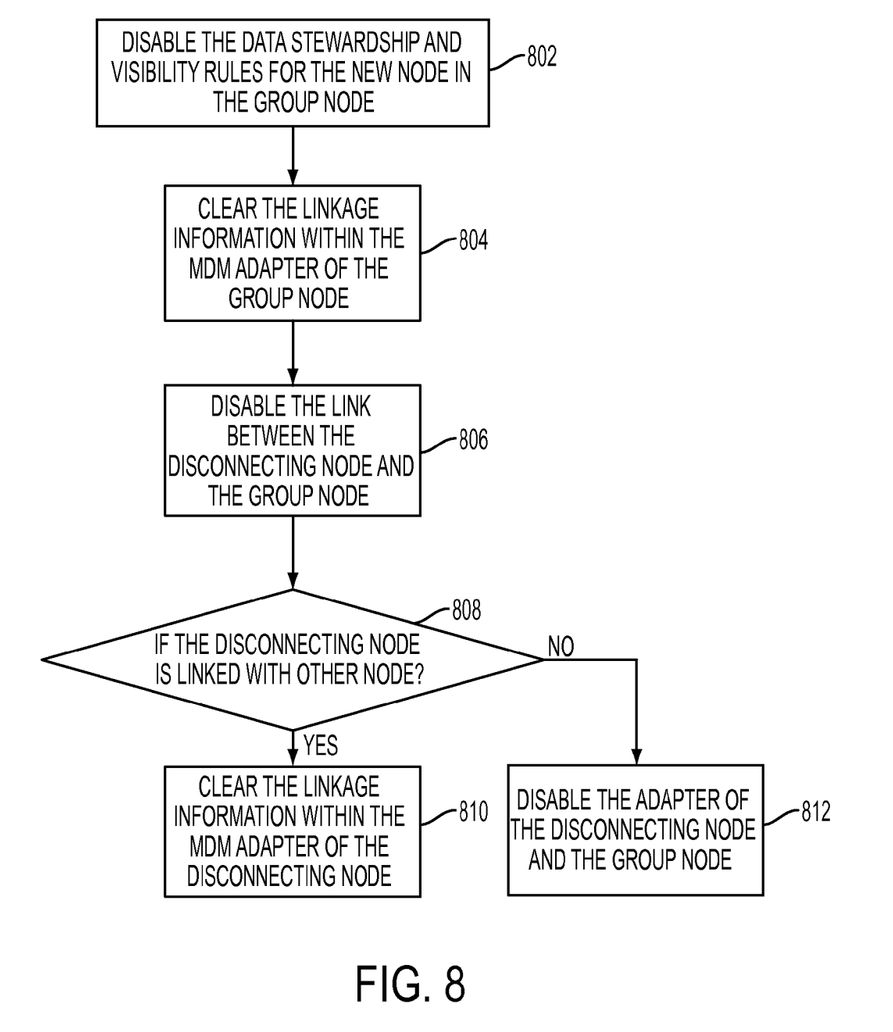
FIG. 8 is a flow diagram illustrating a method of removing an MDM node from a group in one embodiment of the present disclosure.

FIG. 8 is a flow diagram illustrating a method of removing an MDM node from a group in one embodiment of the present disclosure. At 802, the data stewardship and visibility rules for the node to be removed (also referred to as a disconnecting node) are disabled. In one embodiment of the present disclosure, "data stewardship" repository corresponding to the disconnecting node is disabled and then removed when it is no longer used. Also, the corresponding visibility rules may be removed. At 804, the linkage information within the MDM adapter of the group node is cleared. At 806, the link between the disconnecting node and the group node is disabled. The order to disconnecting the communication between the group MDM node and the disconnecting node allows quiescing before removing. The steps at 804 and 806 disconnect the communication linkage between the group MDM node and disconnecting node.

At 808, it is determined whether the disconnecting node is linked with other nodes. If the disconnecting MDM node contains the linkage information to other MDM nodes or one or more other MDM nodes have a reference to this node, the reference or linkage may be removed, if desired. At 810, if the disconnecting node is linked with other nodes, the linkage information within the MDM adapter of the disconnecting node is cleared. The linkage information points to which one or more MDM nodes a MDM node (e.g., the disconnecting node) is connected to and the architectural types of the linking MDM nodes. At 812, if the disconnecting node is not linked with other nodes, the adapter of the disconnecting node is disabled. A group MDM node need not be disabled, e.g., unless there is no member within its group and if the group MDM node itself is to be removed.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The systems and methodologies of the present disclosure may be carried out or executed in a computer system that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen for presenting output displays and providing a display through which the user may input data and interact with the processing system, for instance, in cooperation with input devices such as the keyboard and mouse device or pointing device. The computer processing system may be also connected or coupled to one or more peripheral devices such as the printer, scanner, speaker, and any other devices, directly or via remote connections. The computer processing system may be connected or coupled to one or more other processing systems such as a server, other remote computer processing system, network storage devices, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A system for federating multiple-level master data management systems, comprising:
one or more processors;
a first set of master data management nodes, executable on the one or more processors, having one or more common characteristics; and
a first group master data management node assigned to centrally manage the first set of master data management nodes, the first group master data management node maintaining master data management functionalities at a group level and providing a single logical view of master data to the first set of master data management nodes,
each master data management node in the first set having data access link with the first group master data management node based on implementation style of said each master data management node,
said each master data management node comprising a plurality of applications that link to said each master data management node for management of data objects used by the plurality of applications,
wherein the first group master data management node supports a plurality of implementation styles associated with the data objects for providing a consolidated view of data used in said first set of master data management nodes and the plurality of applications,
the implementation styles comprising at least registry architecture style, consolidation architecture style, transaction architecture style, and coexistence architecture style,
wherein in the registry architecture style, said each master data management node maintains it own data within said each master data management node, and the first group master data management node maintains references to the data wherein the consolidated view of data is provided as a virtual consolidated view,
wherein in the consolidation architecture style, each of said plurality of applications stores its own data, periodically replicating to said each master data management node, and the data replicated to said each master data management node is not published to said plurality of applications,
wherein in the coexistence architecture style, said each master data management node maintains it own data within said each master data management node, periodically replicating to said first group master data management node, and the data replicated to said first group master data management node is published to said plurality of applications,
wherein in the transaction architecture style, the data used in said first set of master data management nodes are maintained in said first group master data management node, wherein said first set of master data management nodes subscribe to updates published from the first group master data management node.

2. The system of claim 1, further including:
a root master data management node assigned to centrally manage the first group master data management node, the first group master data management node directly linked with the root master data management node, root master data management node maintaining master data management functionalities at a root level and providing a single logical hierarchy view of all master management nodes based on organization information.

3. The system of claim 2, further including:
a second set of master data management nodes having one or more common characteristics; and
a second group master data management node assigned to centrally manage the second set of master data management nodes, the second group master data management node maintaining master data management functionalities at a group level and providing a single logical view of master data to the second set of master data management nodes,
each master data management node in the second set having data access link with the second group master data management node based on implementation style of said each master data management node.

4. The system of claim 3, wherein the second group master data management node links directly to the root master data management node, and the root master data management node centrally manages the second group master data management node.

5. The system of claim 4, wherein each of the master data management nodes in the first set is enabled to communicate with each of the master data management nodes in the second set by communicating via the first group master data management node, the second group master data management node and the root master data management node.

6. The system of claim 5, wherein the root master data management node holds as the master data, aggregated data which the first group master data management node and the second group master data management node share.

7. The system of claim 6, wherein the first group master data management node and the second group master data management node each has associated rules of visibility, and the root master data management node provides view of the master data according to the associated rules of visibility to the first group master data management node and the second group master data management node.

8. The system of claim 1, wherein the first group master data management node holds as the master data, aggregated data which the first set of master data management nodes share.

9. The system of claim 8, wherein each master data management node in the first set has associated rules of visibility, and the first group master data management node provides view of the master data according to the associated rules of visibility to said each master data management node.

10. The system of claim 1, wherein if a master data management node in the first set is implemented in registry style, a bi-direction reference link is established as the data access link between the master data management node and the first group master data management node.

11. The system of claim 1, wherein if a master data management node in the first set is implemented in transaction style, an operational link is established as the data access link between the master data management node and the first group master data management node.

12. A method of federating multiple-level master data management systems, comprising:

grouping a first set of master data management nodes according to one or more common characteristics and collecting information associated with the first set of master data management nodes;

creating a first group master data management node to centrally manage the first set of master data management nodes and master data shared among the first set of master data management nodes;

establishing rules of visibility for each master data management node in the first set based on the collected information; and establishing data access link type between the first group master data management node and said each master data management node in the first set based on implementation style of said each master data management node, said each master data management node comprising a plurality of applications that link to said each master data management node for management of data objects used by the plurality of applications, wherein the first group master data management node supports a plurality of implementation styles associated with the data objects for providing a consolidated view of data used in said first set of master data management nodes and the plurality of applications, the implementation styles comprising at least registry architecture style, consolidation architecture style, transaction architecture style, and coexistence architecture style, wherein in the registry architecture style, said each master data management node maintains it own data within said each master data management node, and the first group master data management node maintains references to the data wherein the consolidated view of data is provided as a virtual consolidated view, wherein in the consolidation architecture style, each of said plurality of applications stores its own data, periodically replicating to said each master data management node, and the data replicated to said each master data management node is not published to said plurality of applications, wherein in the coexistence architecture style, said each master data management node maintains it own data within said each master data management node, periodically replicating to said first group master data management node, and the data replicated to said first group master data management node is published to said plurality of applications, wherein in the transaction architecture style, the data used in said first set of master data management nodes are maintained in said first group master data management node, wherein said first set of master data management nodes subscribe to updates published from the first group master data management node.

13. The method of claim 12, further including:

creating a root master data management node to manage the first group master data management node; and establishing a physical link between the root master data management node and the first group master data management node.

14. The method of claim 13, further including:

grouping a second set of master data management nodes according to one or more common characteristics and collecting information associated with the second set of master data management nodes;

creating a second group master data management node to centrally manage the second set of master data management nodes and master data shared among the second set of master data management nodes;

establishing rules of visibility for each master data management node in the second set based on the collected information; and establishing data access link type between the second group master data management node and said each master data management node in the second set based on implementation style of said each master data management node in the second set.

15. The method of claim 14, further including:

establishing a physical link between the root master data management node and the second group master data management node.

16. The method of claim 15, further including:

aggregating in the root master data management node, data which the first group master data management node and the second group master data management node share.

17. A non-transitory computer readable storage medium storing a program of instructions executable by a machine to perform a method of federating multiple-level master data management systems, comprising:

grouping a first set of master data management nodes according to one or more common characteristics and collecting information associated with the first set of master data management nodes;

creating a first group master data management node to centrally manage the first set of master data management nodes and master data shared among the first set of master data management nodes;

establishing rules of visibility for each master data management node in the first set based on the collected information; and establishing data access link type between the first group master data management node and said each master data management node in the first set based on implementation style of said each master data management node, said each master data management node comprising a plurality of applications that link to said each master data management node for management of data objects used by the plurality of applications, wherein the first group master data management node supports a plurality of implementation styles associated with the data objects for providing a consolidated view of data used in said first set of master data management nodes and the plurality of applications, the implementation styles comprising at least registry architecture style, consolidation architecture style, transaction architecture style, and coexistence architecture style, wherein in the registry architecture style, said each master data management node maintains it own data within said each master data management node, and the first group master data management node maintains references to the data wherein the consolidated view of data is provided as a virtual consolidated view, wherein in the consolidation architecture style, each of said plurality of applications stores its own data, periodically replicating to said each master data management node, and the data replicated to said each master data management node is not published to said plurality of applications, wherein in the coexistence architecture style, said each master data management node maintains it own data within said each master data management node, periodically replicating to said first group master data management node, and the data replicated to said first group master data management node is published to said plurality of applications, wherein in the transaction architecture style, the data used in said first set of master data management nodes are maintained in said first group master data management node, wherein said first set of master data management nodes subscribe to updates published from the first group master data management node.

18. The computer readable storage medium of claim 17, further including:

creating a root master data management node to manage the first group master data management node; and establishing a physical link between the root master data management node and the first group master data management node.

19. The computer readable storage medium of claim 18, further including:

grouping a second set of master data management nodes according to one or more common characteristics and collecting information associated with the second set of master data management nodes;

creating a second group master data management node to centrally manage the second set of master data management nodes and master data shared among the second set of master data management nodes;

establishing rules of visibility for each master data management node in the second set based on the collected information; and establishing data access link type between the second group master data management node and said each master data management node in the second set based on implementation style of said each master data management node in the second set.

20. The computer readable storage medium of claim 19, further including:

establishing a physical link between the root master data management node and the second group master data management node.

21. The computer readable storage medium of claim 20, further including:

aggregating in the root master data management node, data which the first group master data management node and the second group master data management node share.

* * * * *